US006957262B2

(12) United States Patent
Kimura et al.

(10) Patent No.: US 6,957,262 B2
(45) Date of Patent: Oct. 18, 2005

(54) NETWORK SYSTEM TRANSMITTING DATA TO MOBILE TERMINAL, SERVER USED IN THE SYSTEM, AND METHOD FOR TRANSMITTING DATA TO MOBILE TERMINAL USED BY THE SERVER

(75) Inventors: Shinya Kimura, Yokohama (JP); Yutaka Kobayashi, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 692 days.

(21) Appl. No.: 09/757,294

(22) Filed: Jan. 9, 2001

(65) Prior Publication Data

US 2002/0133595 A1 Sep. 19, 2002

(30) Foreign Application Priority Data

Jan. 11, 2000 (JP) ........................................ 2000-002283

(51) Int. Cl.[7] .............................................. G06F 15/16
(52) U.S. Cl. ........................ 709/227; 709/203; 709/217; 370/338
(58) Field of Search ................................. 709/200–203, 709/217–219, 225, 227, 238, 242, 245, 249, 239; 370/328, 329, 338

(56) References Cited

U.S. PATENT DOCUMENTS

| 5,839,072 | A | | 11/1998 | Chien | |
|---|---|---|---|---|---|
| 6,407,988 | B1 | * | 6/2002 | Agraharam et al. | 370/328 |
| 6,430,698 | B1 | * | 8/2002 | Khalil et al. | 709/201 |
| 6,501,767 | B1 | * | 12/2002 | Inoue et al. | 370/465 |
| 6,515,974 | B1 | * | 2/2003 | Inoue et al. | 370/352 |
| 6,549,522 | B1 | * | 4/2003 | Flynn | 709/239 |
| 6,587,882 | B1 | * | 7/2003 | Inoue et al. | 709/227 |
| 6,621,810 | B1 | * | 9/2003 | Leung | 370/338 |
| 6,651,105 | B1 | * | 11/2003 | Bhagwat et al. | 709/239 |
| 6,684,256 | B1 | * | 1/2004 | Warrier et al. | 709/238 |
| 6,738,362 | B1 | * | 5/2004 | Xu et al. | 370/329 |
| 6,760,444 | B1 | * | 7/2004 | Leung | 709/227 |

OTHER PUBLICATIONS

IETF RFC 2002 (IP Mobility Support), pp. 1–78, by C. Perkins. Oct., 1996.
*IP Addressing and Routing in a Local Wireless Network*, Cohen D. et al., One World Through Communications—May 4–8, 1992, Proceedings of the Conference on Computer Communications (INFOCOM), N.Y., IEEE, U.S., vol. 2, Conf. 11, May 4, 1992, pp. 626–632.
*Cellular Networks and Mobile Internet*, A. Seneviratne, et al., Computer Communications 21, (1998), pp. 1244–1255.
European Search Report dated Nov. 4, 2002.

* cited by examiner

Primary Examiner—Moustafa M. Meky
(74) Attorney, Agent, or Firm—David G. Conlin; David A. Tucker; Edwards & Angell, LLP

(57) ABSTRACT

A system communicating data with a mobile node includes a server and a plurality of networks connected to the server. The mobile node moves between the plurality of networks. One of the networks is set as a home network of the mobile node. The server includes a storage circuit that stores, when it is detected that the mobile node has moved from its home network to another network, an IP address of the mobile node and information indicating the network to which the mobile node has moved, in a location management table. The server further includes a communication circuit that, upon receipt of data destined for the mobile node, forwards the received data to the network that is specified by the information stored in the location management table corresponding to the mobile node.

24 Claims, 14 Drawing Sheets

| HGW LOCATION MANAGEMENT TABLE ||
|---|---|
| HOME ADDRESS | CARE-OF ADDRESS |
| HOME ADDRESS | CARE-OF ADDRESS OF FOREIGN ROUTER |
| ... | ... |
| ... | ... |
| ... | ... |

FIG. 7    PRIOR ART

| MN LOCATION INFORMATION DATA | | |
|---|---|---|
| IP ADDRESS | HOME AGENT ADDRESS | CURRENT ADDRESS |
| IP ADDRESS OF MN | ADDRESS OF HGW | ADDRESS OF HGW |

FIG. 8    PRIOR ART

| AGENT ADVERTISEMENT MESSAGE (HGW / FOREIGN ROUTER → MN) | |
|---|---|
| COMMUNICATION HEADER | ADDRESS OF HGW / FOREIGN ROUTER |

FIG. 9    PRIOR ART

| LOCATION REGISTRATION REQUEST MESSAGE (MN → HGW) | | | |
|---|---|---|---|
| COMMUNICATION HEADER | ADDRESS OF HGW AS DESTINATION | IP ADDRESS OF MN AS SENDER | ADDRESS OF HGW / FOREIGN ROUTER RECEIVED BY MN |

FIG. 17

| LOCATION REGISTRATION REQUEST MESSAGE (MN → ISP) | | | |
|---|---|---|---|
| COMMUNICATION HEADER | ADDRESS OF ISP AS DESTINATION | IP ADDRESS OF MN AS SENDER | ADDRESS OF HGW / FOREIGN ROUTER RECEIVED BY MN |

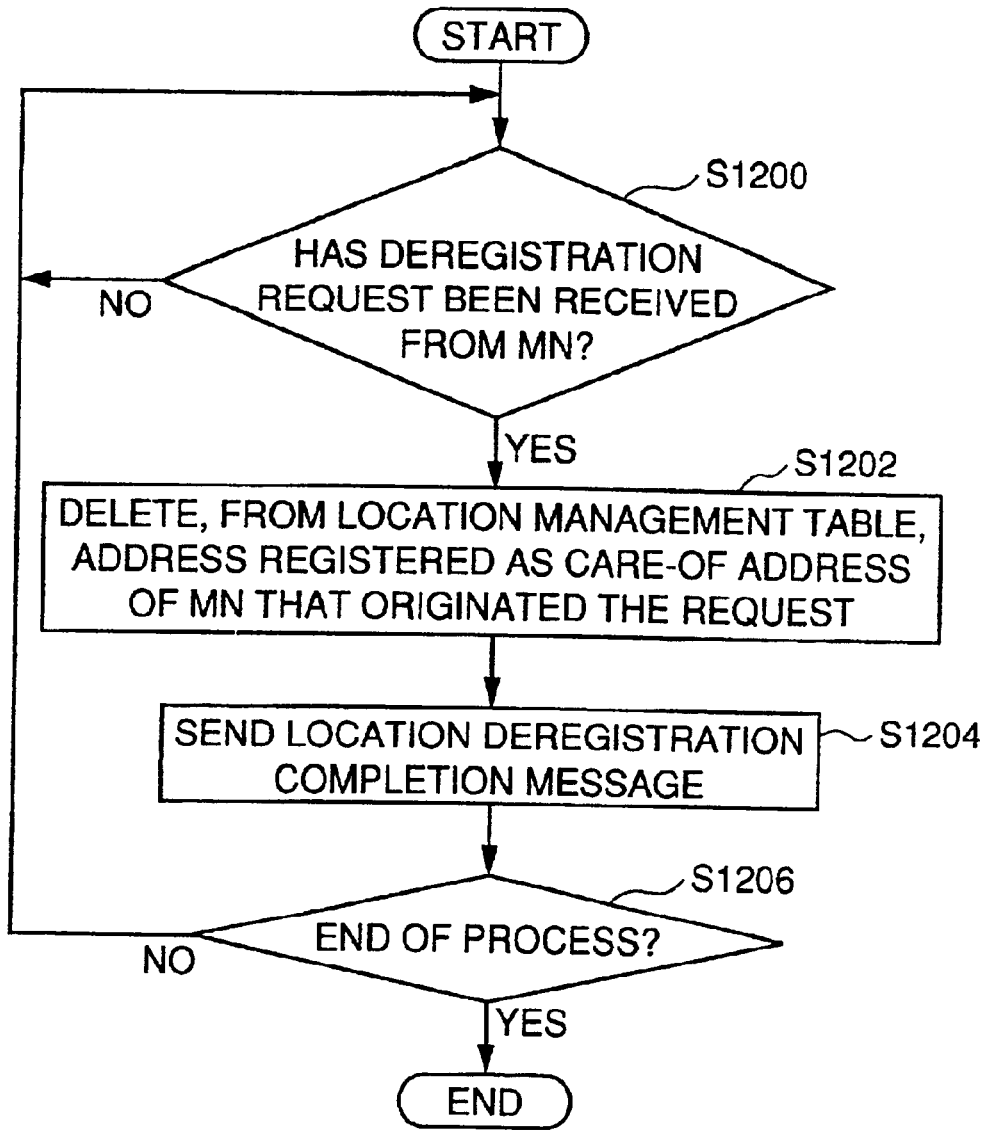

NETWORK SYSTEM TRANSMITTING DATA TO MOBILE TERMINAL, SERVER USED IN THE SYSTEM, AND METHOD FOR TRANSMITTING DATA TO MOBILE TERMINAL USED BY THE SERVER

BACKGROUND OF THE INVENTION

1. Field of the Invention

The present invention relates to systems that communicate data with mobile terminals, and more particularly, to a system that communicates employing a protocol called a mobile IP (Internet Protocol) standardized by IETF (Internet Engineering Task Force).

2. Description of the Background Art

Recently, mobile terminals including mobile phones and personal digital assistants (PDA) have been widespread, which perform data communication wirelessly. To enable such data communication over networks, each mobile terminal predetermines its primary assigned network. The mobile terminal performs the data communication via a wireless communication device (hereinafter, "communication device") included in the predetermined network.

The mobile IP standardized by IETF is a communication protocol that is used when a mobile terminal is out of a communication range of the communication device included in its predetermined network. This mobile IP allows the mobile terminal to communicate even when it has moved to a network other than the predetermined network, without a need to change its IP address identifying itself.

A network system realizing communication of mobile terminals using this mobile IP will now be described. As shown in FIG. 1, the network system includes: a plurality of home networks 100; a server (hereinafter, "ISP") 200 connected to the plurality of home networks 100, which is operated by an Internet service provider (provider company); a foreign router 300; a foreign network 400 such as a local area network (LAN); a data communication terminal 500 connected to foreign router 300; and a public IP network 600 that communicates using IP packets. ISP 200, foreign router 300 and foreign network 400 are connected to public IP network 600.

Home network 100 includes: a home gateway 110 having a routing function that forwards packets between routers; a mobile node 160 as a mobile terminal that moves between the home network and the foreign network; and an access point (hereinafter, "AP") 150 that is connected to home gateway 110 and transmits data received via home gateway 110 to mobile node 160 wirelessly. Home gateway 110 connects home network 100 with a network other than the home network 100. Home gateway 110 has an agent function. For mobile node 160, one home network having home gateway 110 as its home agent function will always be set. One network may be set for a plurality of mobile nodes 160 as their home networks.

ISP 200 connects public IP network 600 with a plurality of home networks 100 and foreign networks 400. Via ISP 200, mobile node 160 on home network (e.g., user home network) 100 is able to receive data from data communication terminal 500.

Foreign network 400 has a configuration identical to that of home network 100, except that foreign network 400 is provided with a foreign router 300 while home network 100 is provided with home gateway 110.

Public IP network 600 uses IP packets to realize communication, e.g., between mobile node 160 and data communication terminal 500.

Referring to FIG. 2, home gateway 110 includes: a control unit 120 for control of home gateway 110; a storage unit 130 for storing various kinds of data; and a communication interface 140 for communicating with devices included in home network 100 and with ISP 200. Control unit 120 includes: a routing circuit 122 that forwards IP packets between routers; and an agent advertisement transmission circuit 124 that transmits an agent advertisement message. In practice, agent advertisement transmission circuit 124 is often included in routing circuit 122. Storage unit 130 stores a location management table (representing a status of mobility binding) 132, which is created based on a location registration request message from mobile node 160. Mobile node 160 sends this location registration request message in response to the agent advertisement message transmitted by agent advertisement transmission circuit 124. The agent advertisement message and the location management table will be described in detail below.

Referring to FIG. 3, ISP 200 includes: a control unit 210 for control of ISP 200; a storage unit 220 for storing various kinds of data; and a communication interface 230 for communicating with home gateway 110 and public IP network 600. Control unit 210 includes: a routing circuit 212 that forwards IP packets between routers; and a server circuit 214, for example, for transmitting data to mobile node 160 as a file server.

Referring to FIG. 4, foreign router 300 has a configuration identical to that of home gateway 110. The control unit 310 of foreign router 300 corresponds to control unit 120 of home gateway 110. The storage unit 320 of foreign router 300 corresponds to storage unit 130 of home gateway 110. The communication interface 330 of foreign router 300 corresponds to communication interface 140 of home gateway 110. The routing circuit 312, agent advertisement transmission circuit 314 and location management table 322 of foreign router 300 correspond to routing circuit 122, agent advertisement transmission circuit 124 and location management table 132 of home gateway 110, respectively.

Referring to FIG. 5, mobile node 160 includes: a control unit 162 for control of mobile node 160; a display circuit 164 for display of data received, for example, from a data communication terminal 500; an input circuit 166 used by a user for input of a data request or the like; a storage circuit 168 for storing various kinds of data including location information data; an audio data input/output unit 170 used by a user for input and/or output of audio data; and a wireless communication circuit 172 for wireless communication with AP 150. The location information data will be described in detail below.

FIG. 6 shows an example of the location management table. The location management table is created based on the location registration request message sent from mobile node 160. As shown in FIG. 6, the location management table stores, for each mobile node 160, a home address (IP address) that specifies the mobile node 160, and an address (care-of address) of foreign router 300 or home gateway 110 of a network on which the mobile node 160 is currently located.

FIG. 7 shows an example of the location information data stored in mobile node 160. As shown in FIG. 7, the location information data includes: an IP address for uniquely specifying one mobile node 160 among a plurality of mobile nodes, a home agent address of the mobile node 160, and its current address. The home agent address is the address of home gateway 110. The current address is the address of home gateway 110 or foreign router 300 included in an agent advertisement message received from home gateway 110 or foreign router 300.

FIG. 8 shows an example of the agent advertisement message sent from agent advertisement transmission circuits 124, 314. The agent advertisement message is a message transmitted from home gateway 110 or foreign router 300 to mobile node 160. As shown in FIG. 8, the agent advertisement message includes a communication header, and an address of the home gateway or foreign router. Upon receipt of this agent advertisement message, mobile node 160 compares the home agent address stored in storage unit 168 of mobile node 160 with the address included in the received agent advertisement message to determine whether it is located on its home network or on a foreign network.

Referring to FIG. 9, the location registration request message is sent from mobile node 160 to home gateway 110 when the mobile node 160 determines that it has moved to a foreign network. The location registration request message includes: a communication header; an address of home gateway 110 as a destination; an IP address of mobile node 160 as a sender; and an address of home gateway 110 or foreign router 300 that was included in the agent advertisement message the mobile node received.

Referring to FIG. 10, an operation of this communication system in the case where mobile node 160 moves from its home network 100 to a foreign network 400 will be described. At first, mobile node 160 is located on home network 100, and location management table 132 in home gateway 110 stores no care-of address corresponding to this mobile node 160.

Assume that mobile node 160 moves to foreign network 400 in this state. Mobile node 160 then receives an agent advertisement message from agent advertisement transmission circuit 314 of foreign router 300. The agent advertisement messages are transmitted (multicasted or broadcasted) periodically by agent advertisement transmission circuit 314. Mobile node 160 detects that the address of foreign router 300 included in the received agent advertisement message is different from the home agent address in the location information data stored in storage circuit 168. Thus, mobile node 160 sends a location registration request to home gateway 110. Upon receipt of the location registration request message from mobile node 160, home gateway 110 stores the address of foreign router 300 included therein as a care-of address of the relevant mobile node 160.

Assume that data communication terminal 500 transmits data destined for mobile node 160 in this state. Specifically, data communication terminal 500 sends the data via ISP 200 to home gateway 110 included in the home network of mobile node 160. At this time, an IP header indicating the destination of the data includes the address of home gateway 110 and the address of mobile node 160. Home gateway 110, referring to location management table 132 in storage unit 130, adds the care-of address of mobile node 160 (i.e., address of foreign router 300) to the IP header, and forwards the data to foreign router 300. Upon receipt of the data, foreign router 300 removes the care-of address therefrom, and delivers the data to mobile node 160 via AP 150. In this manner, it is possible to send data to mobile node 160 that has moved from its home network to a foreign network.

A process performed by home gateway 110 will now be described with reference to a flow chart in FIG. 11.

In step (S) 100, control unit 120 determines whether a location registration request message as shown in FIG. 9 has been received from mobile node 160. If such message has been received (YES in S100), the process goes to S102. Otherwise (NO in S100), the process goes to S106.

In S102, control unit 120 stores, in location management table 132, an address of foreign router 300 included in the received location registration request message as a care-of address of the mobile node 160 that originated the request. Note that home gateway 110 may receive, instead of the address of foreign router 300, an address of home gateway 110 of another home network other than its own home network. This happens when mobile node 160 has moved to a home network other than its own home network.

In S104, control unit 120 transmits a location registration completion message to mobile node 160. In S106, control unit 120 determines whether data destined for mobile node 160 has been received from ISP 200. This may be the data transmitted from data communication terminal 500 to mobile node 160. If such data has been received from ISP 200 (YES in S106), the process goes to S108. Otherwise (NO in S106), the process returns to S100.

In S108, control unit 120 determines whether a care-of address has been set in location management table 132 for mobile node 160 as the destination of the transmitted data. If the care-of address has been set (YES in S108), the process goes to S110. Otherwise (NO in S108), the process goes to S114.

In S110, control unit 120 acquires the care-of address from location management table 132, and adds to the data a new header including this care-of address as the destination address (encapsulation). In S112, control unit 120 forwards the data to the care-of address (by tunneling). Upon receipt of the data, foreign router 300 removes the header, and sends the data via AP 150 included in foreign network 400 to mobile node 160.

This routing function of home gateway 110 by which data is forwarded via a tunnel to foreign router 300 of a foreign network on which the mobile node 160 is now located is called a home agent function. The routing function of foreign router 300 by which the data forwarded by the home agent function is delivered to mobile node 160 is called a foreign agent function.

In S114, control unit 120 transmits the data to the designated address without taking a care-of address into consideration. In S116, control unit 120 determines whether to end the process in home gateway 110. This decision is made by checking whether a predetermined condition has been satisfied. If YES in S116, the process ends. Otherwise (NO in S116), the process returns to S100.

In the case where mobile node 160 transmits data while it is on, e.g., foreign network 400, the data is transmitted to a designated address using foreign router 300 of foreign network 400.

In the system as described above, home gateway 110 is provided for each home network 100, and the location management of mobile node 160 is done by each home gateway 110. If the number of home networks 100 increases, the situation occurs where the performance of location management of mobile node 160 depends on a large number of home gateways 110.

In such a system, when mobile node 160 is located on a foreign network, its care-of address set in the location management table in home gateway 110 should first be referred to such that a routing circuit of home gateway 110 can forward packets to the relevant foreign network. Regardless of the current location of mobile node 160, the packets are forwarded to home gateway 110 without exception, which makes the communication redundant. Likewise, for the location registration, it is necessary to send the location registration request message to home gateway 110, which again causes redundant communication. Such redundant communication increases traffic, thereby degrading communication response of the network.

SUMMARY OF THE INVENTION

An object of the present invention is to provide a network system capable of transmitting data to a mobile terminal via an appropriate route, a server for use in such a system, and a method for transmitting data to a mobile terminal for use in such a server.

Another object of the present invention is to provide a network system capable of transmitting data to a mobile terminal without increasing communication traffic, a server for use in such a system, and a method for transmitting data to a mobile terminal for use in such a server.

A further object of the present invention is to provide a network system capable of transmitting data to a mobile terminal via an appropriate route and applicable to the Internet, a server for use in such a system, and a method for transmitting data to a mobile terminal for use in such a server.

A still further object of the present invention is to provide a network system capable of transmitting data to a mobile terminal via an appropriate route even if a large number of networks exist for one mobile terminal, a server for use in such a system, and a method for transmitting data to a mobile terminal for use in such a server.

Yet another object of the present invention is to provide a network system preventing deterioration of quality in real time communication of audio data, image data and the like, a server for use in such a system, and a method for transmitting data to a mobile terminal for use in such a server.

The network system according to the present invention includes a server and a plurality of networks connected to the server. Each network includes: a mobile terminal that receives data and outputs the received data, a communication device that sends data received from the server to the mobile terminal wirelessly, and a detection device that detects any mobile terminal present within a range communicable with the communication device. The mobile terminal moves between the plurality of networks. The mobile terminal has a primary assigned network set as its home network. The server includes a communication circuit that communicates with the communication device and the detection device included in each network, a storage circuit connected to the communication circuit for storage of a location management table, and a control circuit connected to the communication circuit and the storage circuit for control of the communication circuit. The location management table includes, for each mobile terminal, information specifying the network in which the mobile terminal is currently located that is determined based on information received from the detection device, and information specifying the home network. The control circuit receives data and information indicating the mobile terminal as a destination of the data, and controls, based on the received information indicating the mobile terminal as the destination of the data and the information stored in the location management table, such that the communication circuit sends the received data to the mobile terminal as the destination thereof.

When the mobile terminal moves from its home network to another network, the server specifies the network in which the mobile terminal is currently located based on the information received from the detection device. The server stores, for each mobile terminal, information identifying the home network and information identifying the specified network, in a location management table. The server receives data with information indicating the mobile terminal as a destination of the data. The server determines in which network the mobile terminal as the destination is currently located based on the location management table, and sends the data to a communication device included in the relevant network. Thus, even if the mobile terminal has moved from its home network to another network, it is possible to determine the current location of the mobile terminal, not using the home network, but using the server that unitarily manages the home network. More specifically, the data forwarding address can be determined using a location management table stored, not in a home gateway of a lower layer in hierarchy, but in a server of its upper layer. As it is unnecessary to communicate with the home gateway of the lower layer to fetch the data forwarding address therefrom, the data can be sent via a shorter communication route. This decreases redundant communication, and hence communication traffic, thereby improving communication response of the network. With the improvement of communication response, data delay in real time communication of audio data, image data and the like is restricted, so that a network that can prevent deterioration of quality is realized.

Preferably, the server further includes a connect circuit that connects to another network. The server receives the data and the information indicating the mobile terminal as the destination of the data from a device connected to the another network.

The mobile terminal having moved from its home network to another network is able to receive the data transmitted via the Internet that is connected to the server through a public network, using a shorter communication route.

The server according to the present invention is a server used in a system including the server and a plurality of networks connected to the server. The server includes: a communication circuit that communicates with the communication device and the detection device included in each network; a storage circuit connected to the communication circuit for storage of a location management table, and a control circuit connected to the communication circuit and the storage circuit for control of the communication circuit. The location management table includes, for each mobile terminal, information specifying the network in which the mobile terminal is currently located that is determined based on information received from the detection device, and information specifying the home network. The control circuit receives data and information indicating the mobile terminal as a destination of the data, and controls, based on the received information indicating the mobile terminal as the destination of the data and the information stored in the location management table, such that the communication circuit sends the received data to the mobile terminal as the destination thereof.

The server stores, for each mobile terminal, the information identifying the home network and the information identifying the specified network in the location management table. The server receives the data with the information indicating the mobile terminal as the destination thereof. The server determines the network in which the mobile terminal as the destination is currently located based on the location management table, and sends the data to a communication device included in the relevant network. Thus, even if the mobile terminal has moved from its home network to another network, the current location of the mobile terminal can be determined, not using the home network, but using the server that unitarily manages the home network. Accordingly, a server is provided which is used in a network that can decrease redundant communication and hence communication traffic, thereby improving communication response.

The communication method according to another aspect of the present invention is a communication method of a server in a system including the server and a plurality of networks connected to the server. Each network includes a mobile terminal that receives data and outputs the received data, a communication device that sends data received from the server to the mobile terminal wirelessly, and a detection device that detects any mobile terminal present within a range communicable with the communication device. The mobile terminal moves between the plurality of networks. The mobile terminal has a primary assigned network set as its home network. The communication method includes the step of storing a location management table, and the step of receiving data and information indicating the mobile terminal as a destination of the data and, based on the received information indicating the mobile terminal as the destination and the information stored in the location management table, sending the received data to the mobile terminal as the destination thereof. The location management table includes, for each mobile terminal, information specifying the network in which the mobile terminal is currently located that is determined based on information received from the detection device, and information specifying the home network.

When the mobile terminal moves from its home network to another network, a network in which the mobile terminal is currently located is specified based on the information received from the detection device. In the step of storing the location management table, the information identifying the specified network and the information identifying the home network are stored for each mobile terminal. Upon receipt of data along with the information indicating the mobile terminal as the destination thereof, in the step of sending the data to the mobile terminal, the network in which the mobile terminal is currently located is determined based on the location management table, and the data is sent to a communication device included in the relevant network. Thus, even if the mobile terminal has moved from its home network to another network, the current location of the mobile terminal can be determined, not using the home network, but using the server unitarily managing the home network. Accordingly, a communication method is realized which decreases redundant communication and hence communication traffic, and improves communication response of the network.

A recording medium according to yet another aspect of the present invention is a computer readable recording medium storing a program for implementing a communication method of a server in a system including the server and a plurality of networks connected to the server. Each network includes a mobile terminal that receives data and outputs the received data, a communication device that sends data received from the server to the mobile terminal wirelessly, and a detection device that detects any mobile terminal present within a range communicable with the communication device. The mobile terminal moves between the plurality of networks. The mobile terminal has a primary assigned network set as its home network. The communication method includes the step of storing a location management table, and the step of receiving data and information indicating the mobile terminal as a destination of the data, and, based on the received information indicating the mobile terminal as the destination and the information stored in the location management table, sending the received data to the mobile terminal as the destination thereof. The location management table includes, for each mobile terminal, information specifying the network in which the mobile terminal is currently located that is determined based on information received from the detection device, and information specifying the home network.

When the mobile terminal moves from its home network to another network, a network in which the mobile terminal is currently located is specified based on the information received from the detection device. In the step of storing the location management table, the information identifying the specified network and the information identifying the home network are stored for each mobile terminal. Upon receipt of the data along with the information indicating the mobile terminal as the destination thereof, in the step of sending the data to the mobile terminal, the network in which the mobile terminal is currently located is determined based on the location management table, and the data is sent to a communication device included in the relevant network. Thus, even if the mobile terminal has moved from its home network to another network, the current location of the mobile terminal can be determined, not using the home network, but using the server that unitarily manages the home network. Accordingly, it is possible to provide a computer readable recording medium for use in recording a program for implementation of a communication method that can decrease redundant communication and communication traffic, thereby improving communication response of the network.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 shows location information data according to the prior art.

FIG. 8 shows an agent advertisement message according to the prior art.

FIG. 9 shows a location registration request message according to the prior art.

FIG. 17 shows a location registration request message according to the embodiment of the present invention.

FIG. 21 is a second flow chart illustrating the process performed by the server according to the embodiment of the present invention.

DESCRIPTION OF THE PREFERRED EMBODIMENTS

Figure 1:
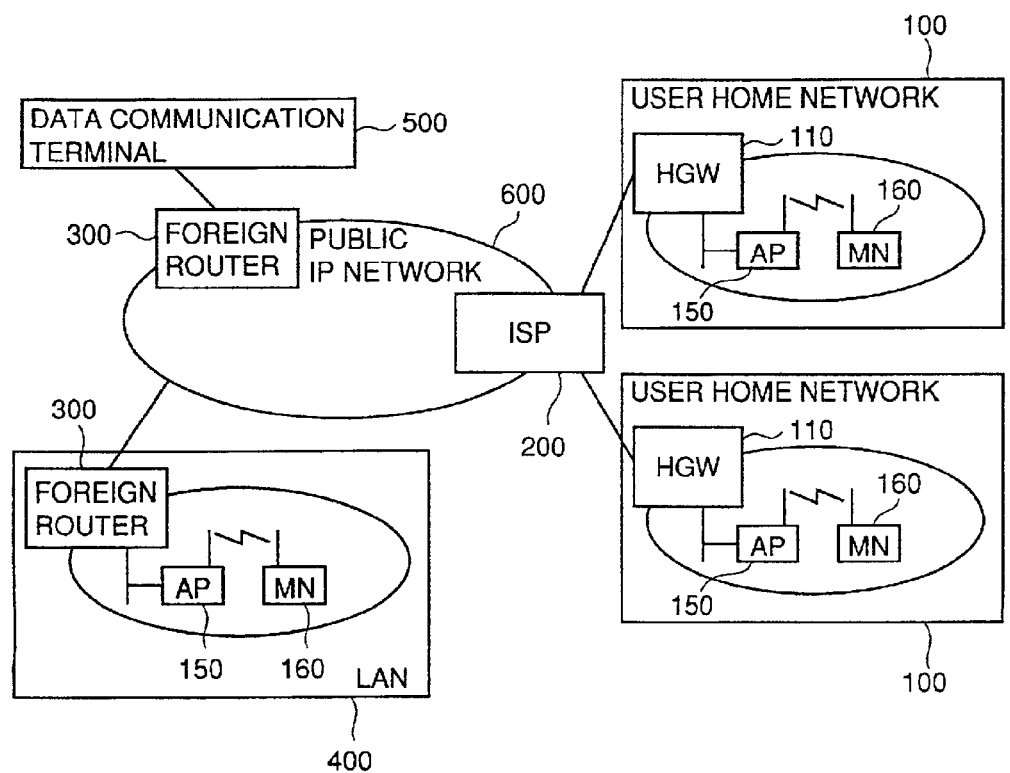
FIG. 1 shows a configuration of a network system according to the prior art.

Hereinafter, embodiments of the present invention will be described with reference to the drawings. Throughout the following description and the drawings, the same components are denoted by the same reference characters and their names and functions are also the same. Thus, detailed description thereof will not be repeated where appropriate.

Figure 12:
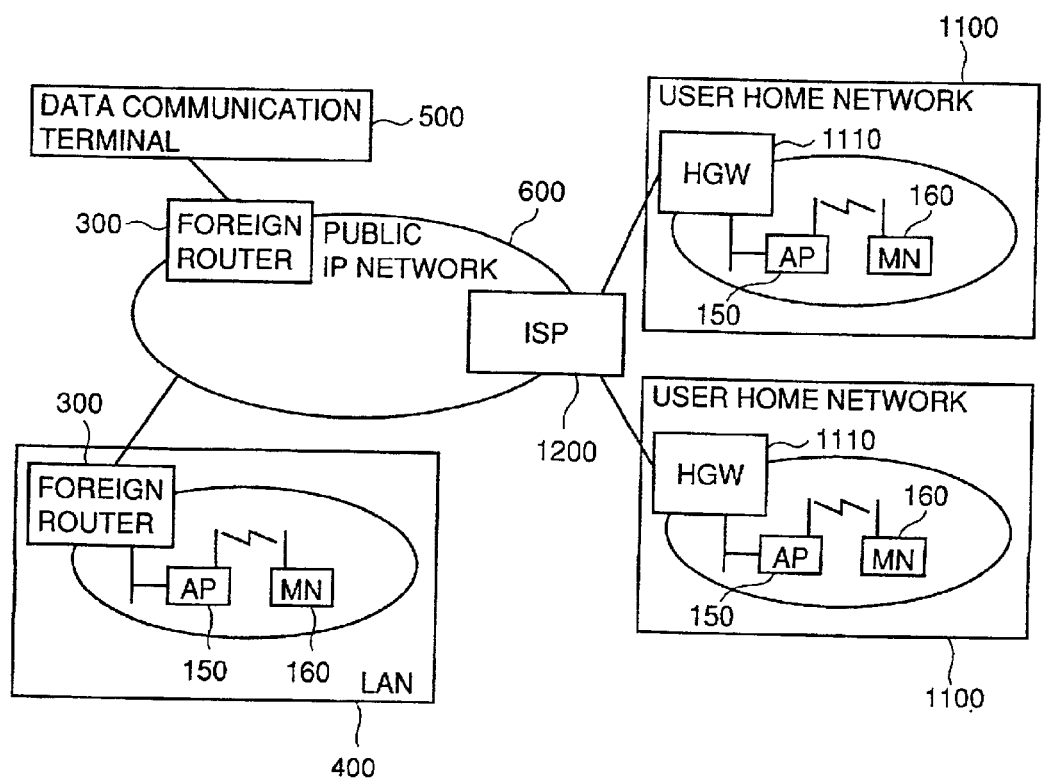
FIG. 12 shows a configuration of a network system according to an embodiment of the present invention.

Referring to FIG. 12, the network system according to the present invention will be described. In FIG. 12, the same reference characters as in FIG. 1 represent the identical configurations, and detailed description thereof is not repeated here.

As shown in FIG. 12, the network system of the present invention includes: a plurality of home networks 1100, an ISP 1200 connected to the plurality of home networks 1100, a foreign router 300, a foreign network 400 such as LAN, a data communication terminal 500 connected to foreign router 300, and a public IP network 600 that communicates using IP packets. The network in FIG. 12 differs from the network in FIG. 1 in the configurations of home network and ISP. Home network 1100 includes a home gateway 1110 that is different in configuration from home gateway 110 in FIG. 1. The differences thereof will now be described.

Figure 2:
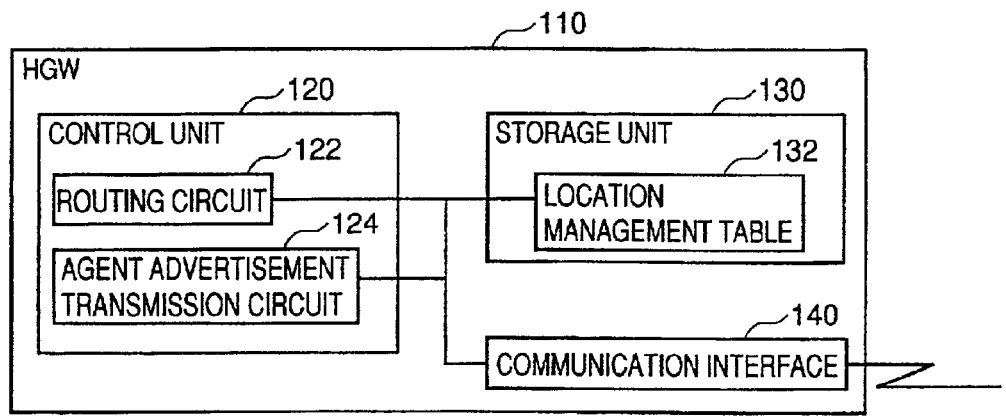
FIG. 2 is a control block diagram of a home gateway according to the prior art.
Figure 13:
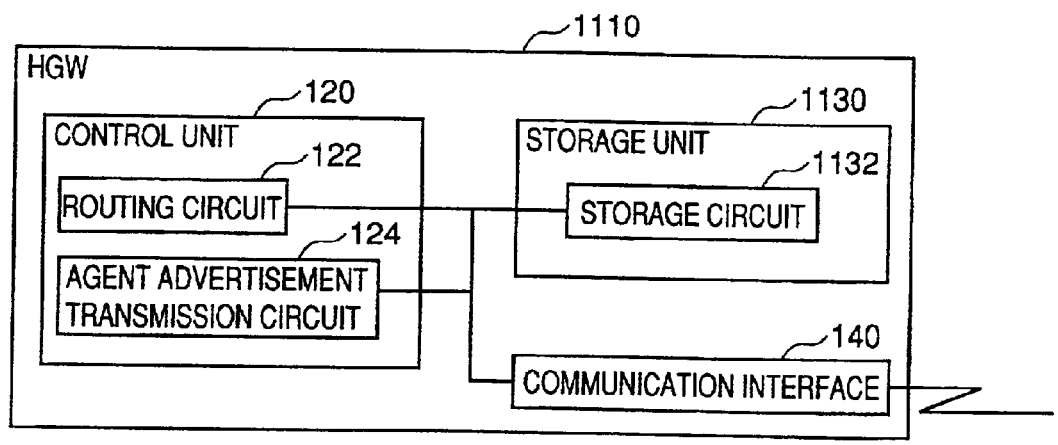
FIG. 13 is a control block diagram of a home gateway according to the embodiment of the present invention.

Referring to FIG. 13, home gateway 1110 includes a control unit 120 for control of home gateway 1110, a storage unit 1130 for storing various kinds of data, and a communication interface 140 for communication with devices included in home network 1100 and with ISP 1200. Control unit 120 includes a routing circuit 122 and an agent advertisement transmission circuit 124. Storage unit 1130 includes a storage circuit 1132 that stores various kinds of data. Storage unit 1130 differs from storage unit 130 of home gateway 110 shown in FIG. 2 in that it does not store the location management table.

Figure 3:
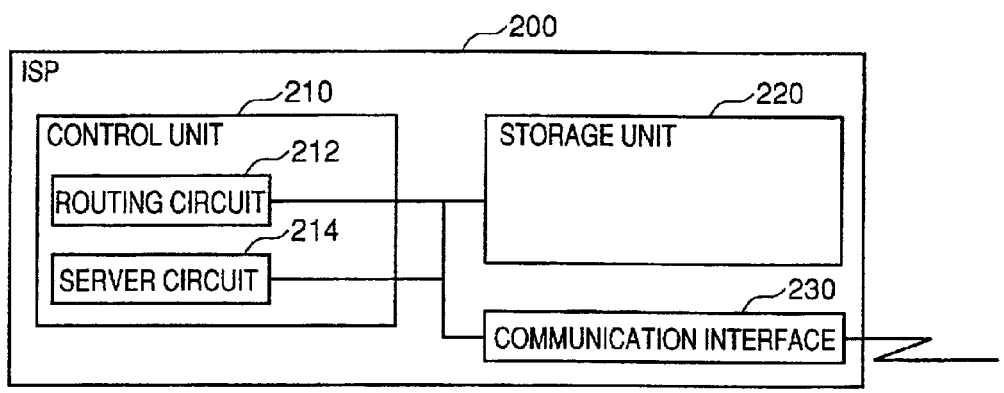
FIG. 3 is a control block diagram of a server provided by an Internet service provider according to the prior art.
Figure 4:
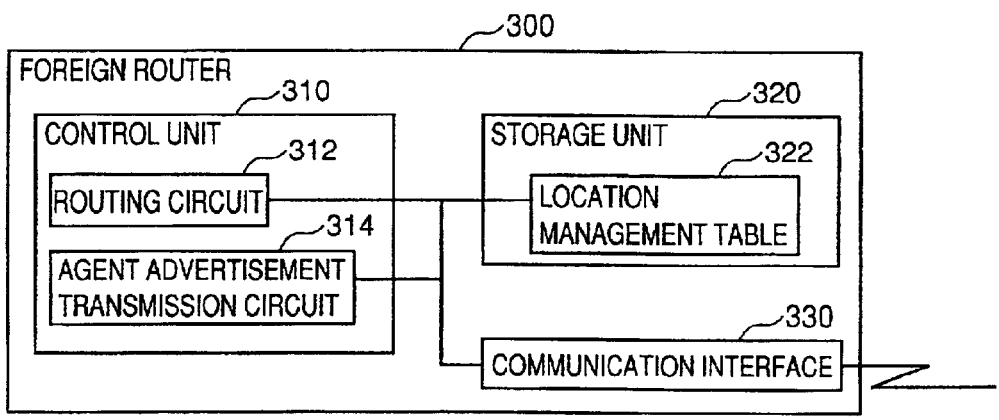
FIG. 4 is a control block diagram of a foreign router according to the prior art.
Figures 5, 6:
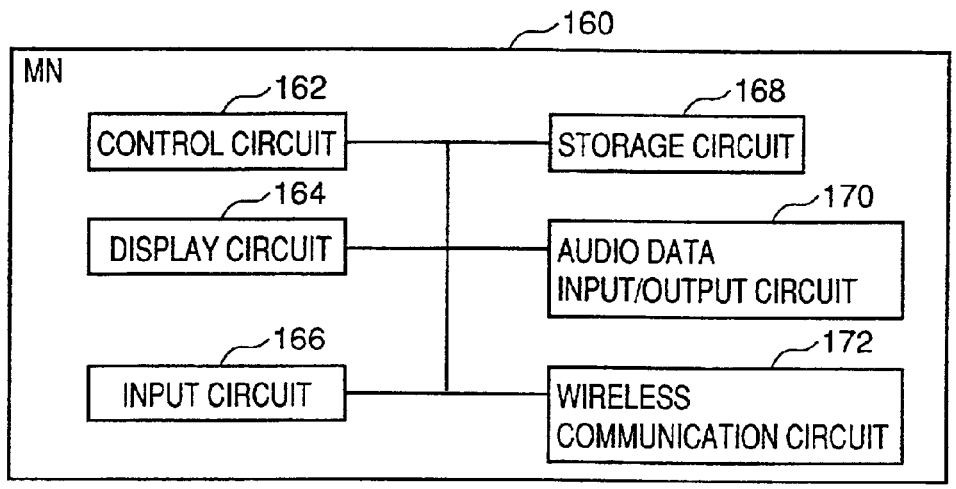
FIG. 5 is a control block diagram of a mobile node according to the prior art.
FIG. 6 shows a data configuration of a location management table according to the prior art.
Figure 10:
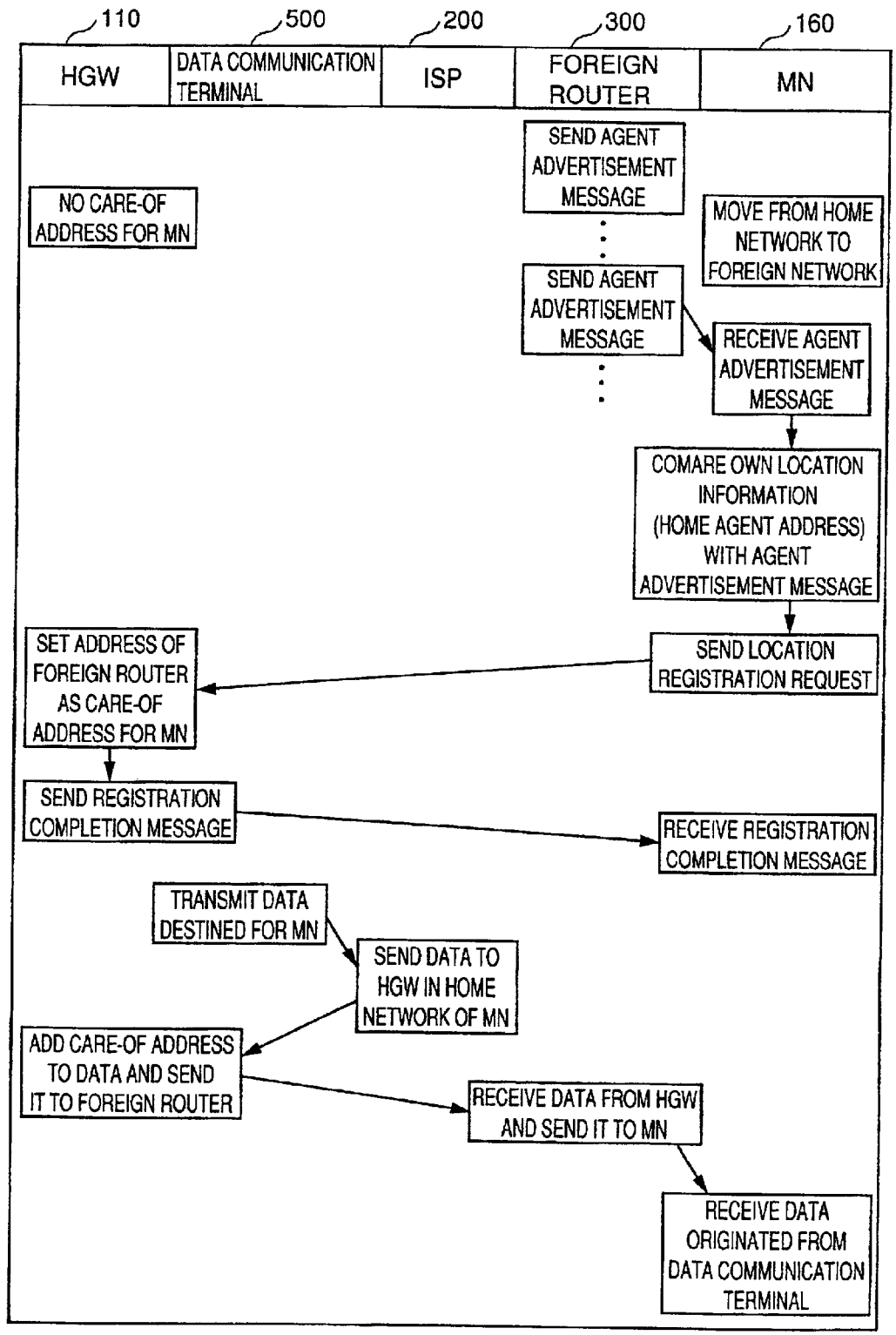
FIG. 10 illustrates an operation of a network system according to the prior art.
Figure 11:
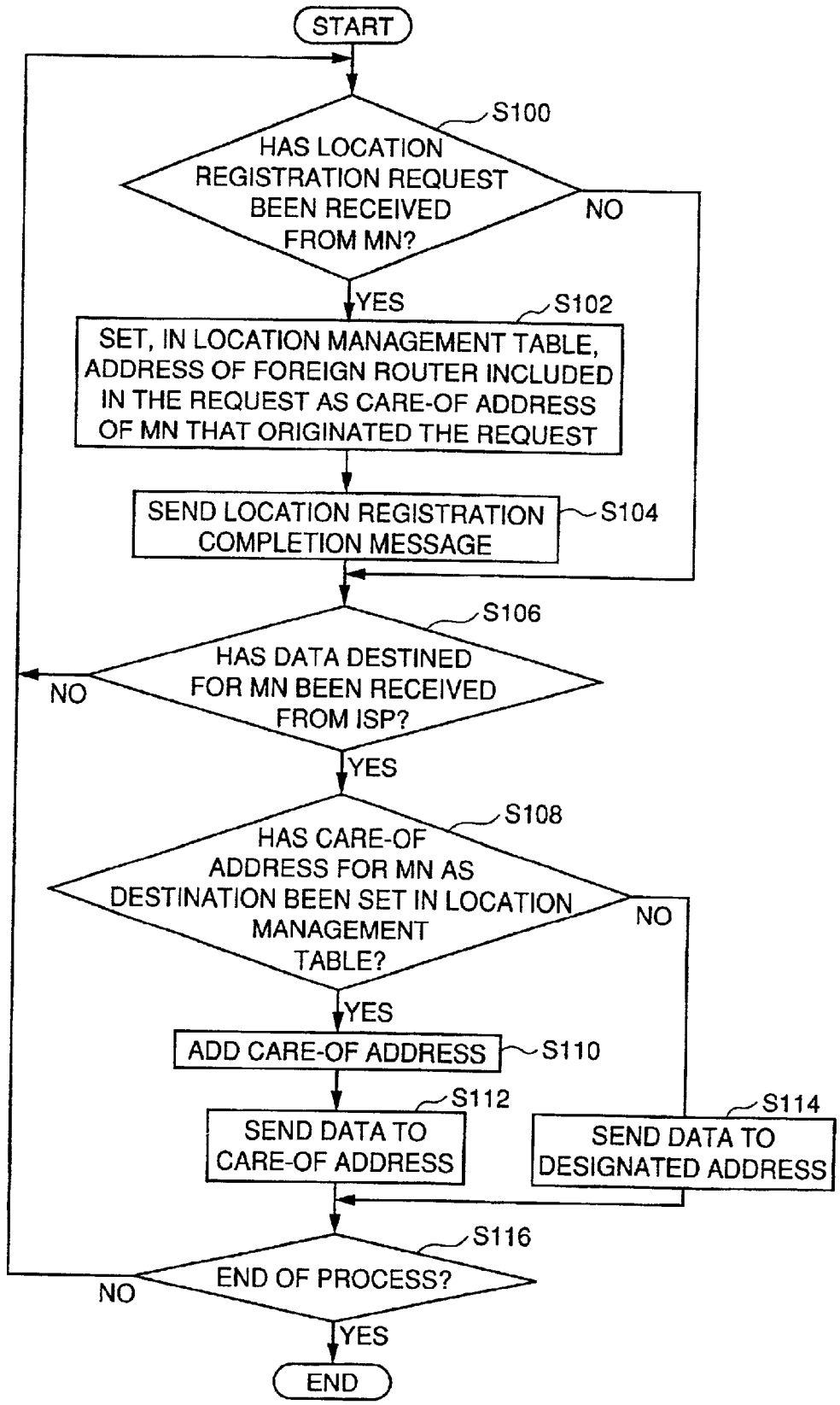
FIG. 11 is a flow chart illustrating a process performed by a server according to the prior art.
Figure 14:
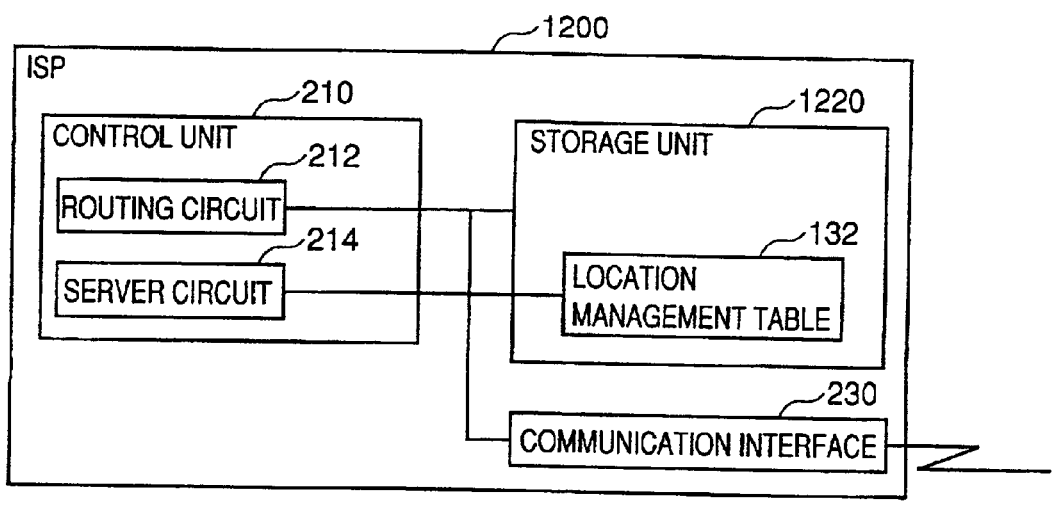
FIG. 14 is a control block diagram of a server provided by an Internet service provider according to the embodiment of the present invention.

Referring to FIG. 14, ISP 1200 includes a control unit 210 for control of ISP 1200, a storage unit 1220 for storing various kinds of data, and a communication interface 230 for communication with home gateway 1110 and public IP network 600. Control unit 210 includes a routing circuit 212 and a server circuit 214. Storage unit 1220 stores a location management table 132. Storage unit 1220 differs from storage unit 220 of ISP 200 shown in FIG. 3 in that it stores location management table 132.

The process being performed in ISP 1200 of the present invention is realized by hardware of a computer such as a personal computer or a workstation and software executed thereon.

Figure 15:
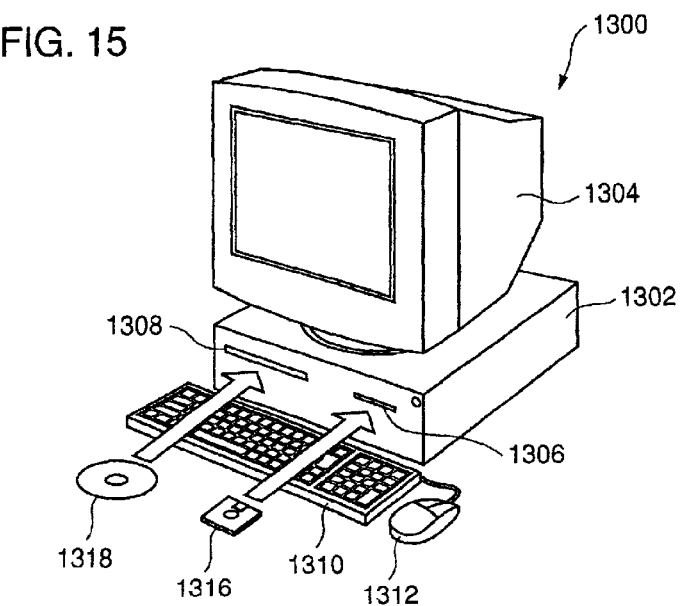
FIG. 15 is an exterior view of a computer as an example of the server provided by an Internet service provider according to the embodiment of the present invention.

FIG. 15 shows a computer as an example of ISP 1200. Referring to FIG. 15, the computer 1300 includes a computer main body 1302 provided with a flexible disk (FD) driving device 1306 and a compact disc-read only memory (CD-ROM) driving device 1308, a monitor 1304, a keyboard 1310 and a mouse 1312.

Figure 16:
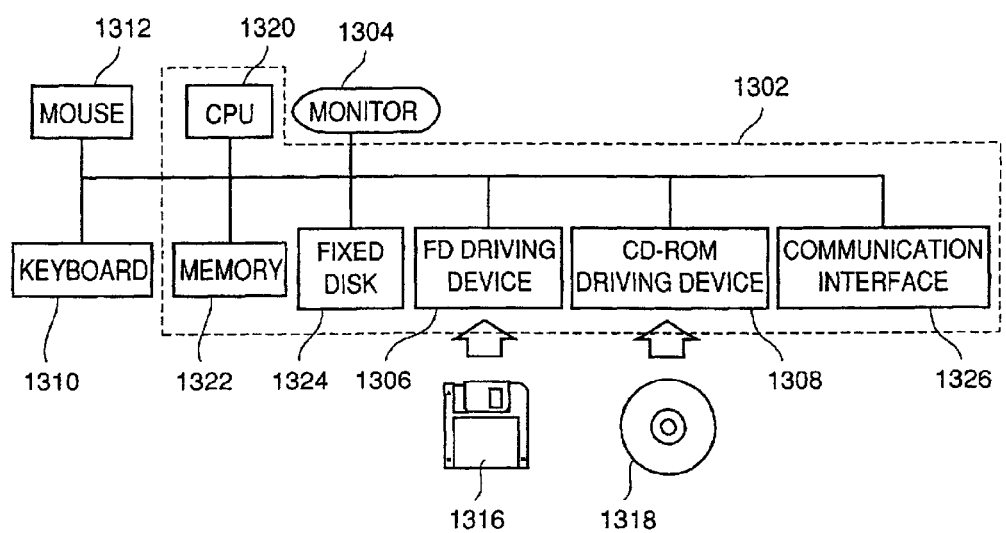
FIG. 16 is a control block diagram of the computer as an example of the server according to the embodiment of the present invention.

FIG. 16 shows a configuration of computer 1300 in a block diagram. As shown in FIG. 16, computer main body 1302 includes, in addition to the above-mentioned FD driving device 1306 and CD-ROM driving device 1308, a central processing unit (CPU) 1320, a memory 1322, a fixed disk 1324, and a communication interface 1326 connected to public IP network 600 and home network 1100, which all are interconnected via a bus. An FD 1316 is mounted on FD driving device 1306, and a CD-ROM 1318 is mounted on CD-ROM driving device 1308.

As already described above, ISP 1200 is realized by computer hardware and software executed by CPU 1320. In general, such software is distributed in a form stored in a recording medium such as FD 1316, CD-ROM 1318 or the like, which is read from the recording medium by FD driving device 1306, CD-ROM driving device 1308 or the like, and temporarily stored in fixed disk 1324. The software is then read out from fixed disk 1324 to memory 1322 for execution by CPU 1320. Since the hardware itself of the computer shown in FIGS. 15 and 16 is of a conventional type, the essential feature of the present invention is the software recorded in the recording medium such as FD 1316, CD-ROM 1318, fixed disk 1324 or the like.

The operation of the computer shown in FIGS. 15 and 16 are well known, so that detailed description thereof will not be repeated here.

FIG. 17 shows an example of the location registration request message according to the present invention. It is originated by mobile node 160 when it decides that it has moved to a foreign network other than its home network, and sent to ISP 1200. The location registration request message includes: a communication header; an address of ISP 1200 as a destination address; an IP address of mobile node 160 as a source address; and an address of home gateway 110 or foreign router 300 that the mobile node received.

Figure 18:
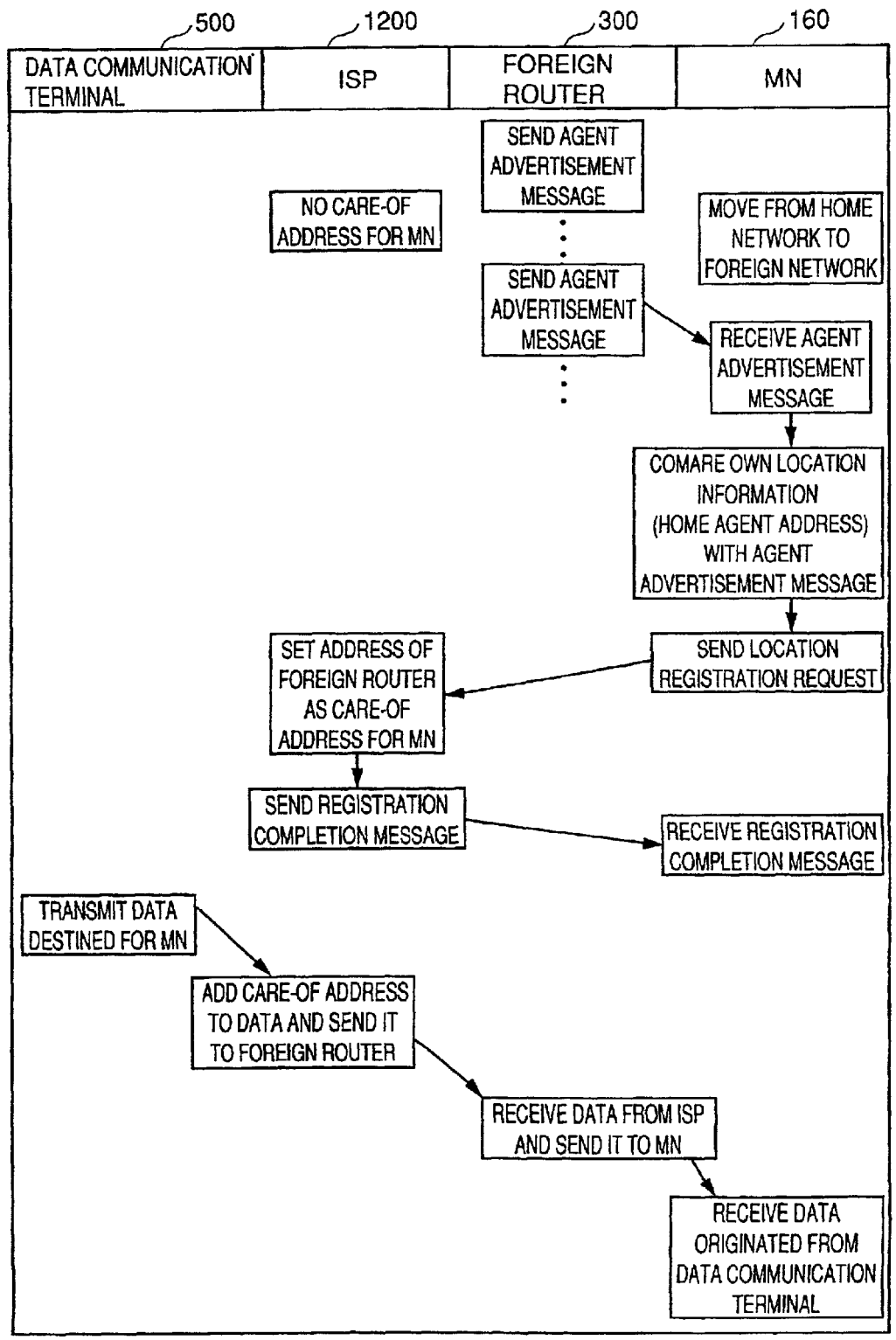
FIG. 18 is a first diagram illustrating an operation of a network system according to the embodiment of the present invention.

Referring to FIG. 18, the operation of the communication system in the case where mobile node 160 moves from home network 1100 to foreign network 400 will be described. Mobile node 160 initially exists in home network 1100. Location management table 132 of ISP 1200 has not stored a care-of address corresponding to the mobile node 160.

Assume that mobile node 160 moves to foreign network 400 in this state. Mobile node 160 then receives an agent advertisement message from agent advertisement transmission circuit 314 in foreign router 300. Mobile node 160 detects that the address of foreign router 300 included in the received agent advertisement message is different from the home agent address in the location information data stored in storage circuit 168. Mobile node 160 thus sends a location registration request message to ISP 1200. ISP 1200 stores the address of foreign router 300 included in the location registration request message received from mobile node 160 as a care-of address of the relevant mobile node 160.

Assume that data communication terminal 500 transmits data destined for mobile node 160 in this state. At this time, data communication terminal 500 sends the data to ISP 1200. ISP 1200 refers to location management table 132 in storage unit 1220, and forwards the data to the care-of address of mobile node 160 (i.e., to foreign router 300). Foreign router 300 receives the data, and delivers the data via AP 150 of foreign network 400 to mobile node 160. Thus, it becomes possible to send data to mobile node 160 having moved from its home network to a foreign network, without a need to route it via home gateway 1110.

Figure 19:
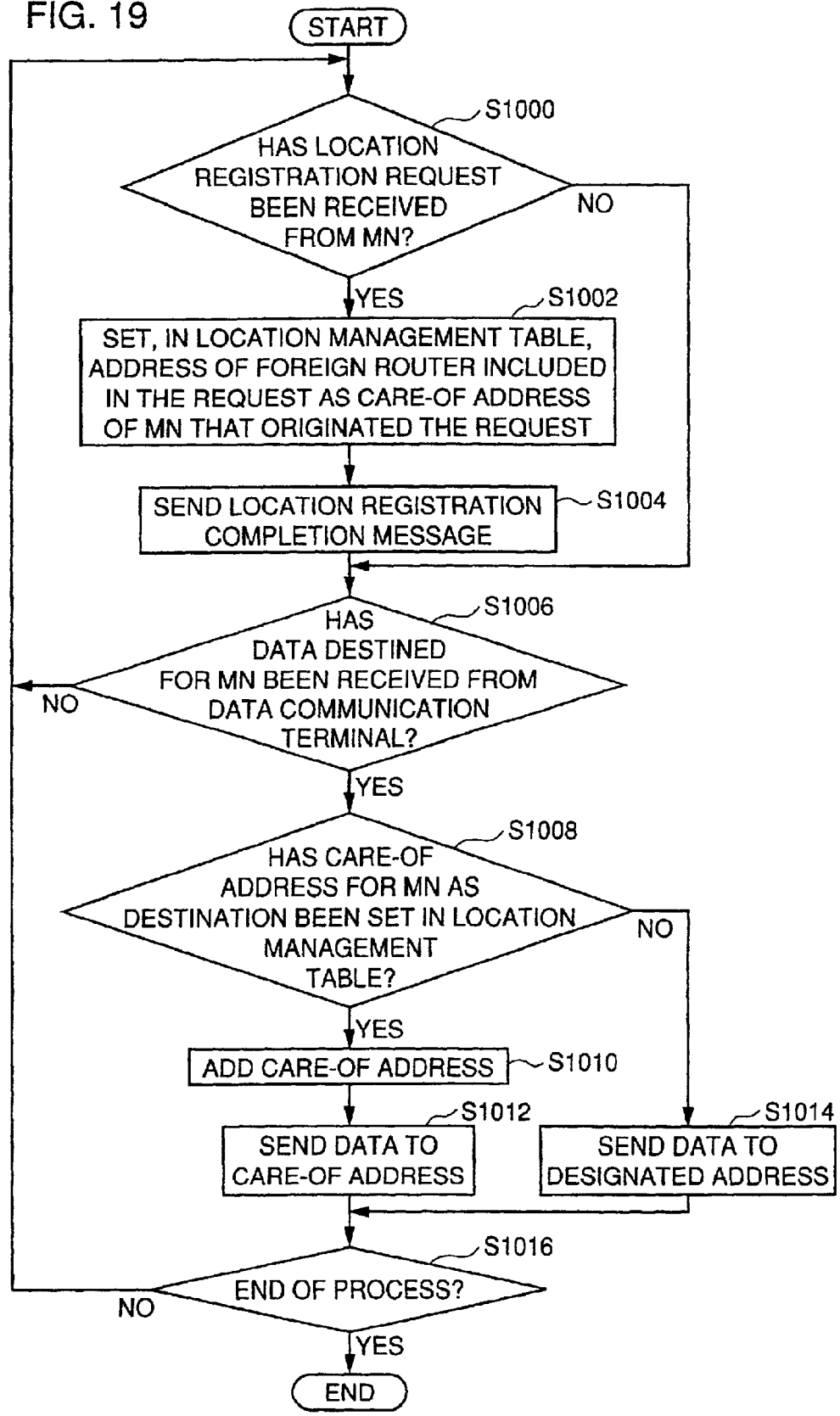
FIG. 19 is a first flow chart illustrating a process performed by a server according to the embodiment of the present invention.

A process for location registration performed by ISP 1200 will be described with reference to the flow chart shown in FIG. 19.

In S1000, CPU 1320 determines whether it has received a location registration request message as shown in FIG. 17 from mobile node 160. When the request message has been received from mobile node 160 (YES in S1000), the process goes to S1002. Otherwise (NO in S1000), the process goes to S1006.

In S1002, CPU 1320 stores, in location management table 132, the address of foreign router 300 included in the received location registration request message as a care-of address of the mobile node 160 that originated the request. Note that there is a case where ISP 1200 receives, instead of the address of foreign router 300, an address of home gateway 1110 of another home network other than its own home network.

In S1004, CPU 1320 sends a location registration completion message to mobile node 160. In S1006, CPU 1320 determines whether it has received any data destined for mobile node 160 from data communication terminal 500. If such data has been received (YES in S1006), the process goes to S1008. Otherwise (NO in S1006), the process returns to S1000.

In S1008, CPU 1320 determines whether a care-of address has been set in location management table 132 for the mobile node 160 as the destination of the data. If the care-of address exists (YES in S1008), the process goes to S1010. Otherwise (NO in S1008), the process goes to S1014.

In S1010, CPU 1320 acquires the care-of address from location management table 132, and adds to the data a new header including this care-of address as a destination address. In S1012, CPU 1320 forwards the data to the care-of address. Foreign router 300 receives the data and removes the header. The data with the header now removed therefrom is delivered via AP 150 to mobile node 160.

In S1014, CPU 1320 sends the data to the designated address without adding a care-of address. In S1016, CPU 1320 determines whether to end the process in ISP 1200. If so (YES in S 1016), the process ends. Otherwise (NO in S1016), the process returns to S1000.

Figure 20:
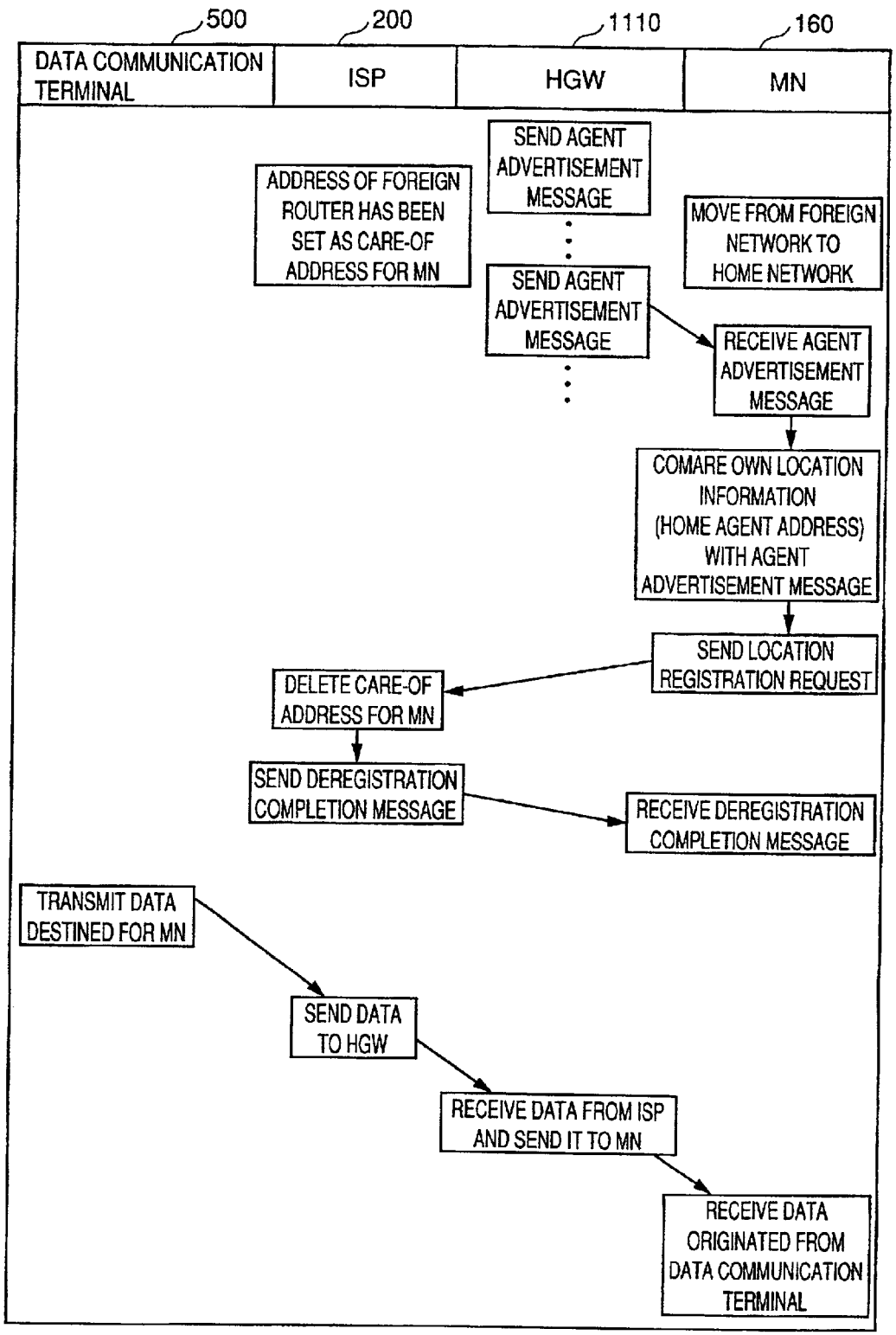
FIG. 20 is a second diagram illustrating the operation of the network system according to the embodiment of the present invention.

Referring to FIG. 20, the operation of the communication system in the case where mobile node 160 having moved from home network 1100 to foreign network 400 returns to home network 1100 will be described. At first, mobile node 160 having moved out of home network 1100 exists in foreign network 400. In location management table 132 of ISP 1200, the address of foreign router 300 has been stored as a care-of address corresponding to this mobile node 160.

Assume that mobile node 160 returns to home network 1100 in this state. Mobile node 160 then receives an agent advertisement message from agent advertisement transmission circuit 124 of home gateway 1110. It detects that the address of home gateway 1110 included in the received agent advertisement message is the same as the home agent address in the location information data stored in storage circuit 168. Mobile node 160 thus sends a deregistration request to ISP 1200. In response, ISP 1200 deletes the care-of address having been stored corresponding to the relevant mobile node 160 in location management table 132.

Assume that data communication terminal 500 transmits data destined for mobile node 160 in this state. At this time, data communication terminal 500 sends the data to ISP 1200. ISP 1200 refers to location management table 132 in storage unit 1220. Since a care-of address is no longer set for mobile node 160, ISP 1200 forwards the data to home gateway 1110. Upon receipt of the data, home gateway 1110 delivers it via AP 150 of home network 1100 to mobile node 160. Thus, it becomes possible to send data to mobile node 160 that has returned to its home network.

A process for deregistration performed by ISP 1200 will be described with reference to the flow chart shown in FIG. 21.

In S1200, CPU 1320 determines whether it has received deregistration request data from mobile node 160. If the data has been received (YES in S1200), the process goes to S1202. Otherwise (NO in S1200), the process goes to S1206.

In S1202, CPU 1320 deletes the address having been registered in location management table 132 as the care-of address of mobile node 160 that originated the deregistration request data.

In S1204, CPU 1320 sends a location deregistration completion message to mobile node 160. In S1206, CPU 1320 determines whether to end the process at ISP 1200. This decision is made according to whether a prescribed condition has been satisfied. If so (YES in S1206), the process ends. Otherwise (NO in S1206), the process returns to S1200.

The operation of the network system according to the above-described configurations and flow charts will now be described.

Operation for Location Registration

The case where mobile node 160 moves from its home network 1100 to foreign network 300 will be described.

Mobile node 160 receives an agent advertisement message from agent advertisement transmission circuit 314 of foreign router 300. Mobile node 160 detects that it has moved to another network other than its home network as the address included in the received agent advertisement message differs from the home agent address in the location information data stored in storage circuit 168. Mobile node 160 thus sends a location registration request message to ISP 1200.

Upon receipt of the location registration request message from mobile node 160 (YES in S1000), ISP 1200 stores the received address as the care-of address of the relevant mobile node 160 in location management table 132 in storage unit 1220 (S1002). ISP 1200 then sends the location registration completion message to mobile node 160 (S1004).

Operation for Forwarding Data

When data communication terminal 500 transmits data destined for mobile node 160, ISP 1200 receives the data (YES in S1006). ISP 1200 refers to location management table 132 in storage unit 1220 to determine whether the care-of address has been set for the mobile node 160 as the destination of the data (S1008). If so (YES in S1008), ISP 1200 adds to the data a header including the care-of address as a destination address (S1000). ISP 1200 then forwards the data to foreign router 300 that is specified by the care-of address.

Upon receipt of the data, foreign router 300 removes the header. The data from which the header has now been removed is delivered to mobile node 160 via AP 150 included in foreign network 400.

Operation for Deregistration

The case where mobile node 160 having moved from home network 1100 to foreign network 400 now returns to home network 1100 will be described.

Mobile node 160 receives an agent advertisement message from agent advertisement transmission circuit 124 in home gateway 1110. Mobile node 160 detects that it has returned to its home network as the address included in the received agent advertisement message matches the home agent address in the location information data stored in storage circuit 168. Mobile node 160 thus sends deregistration request data to ISP 1200.

Upon receipt of the deregistration request data from mobile node 160 (YES in S1200), ISP 1200 deletes the address having been set as the care-of address for the relevant mobile node 160 in location management table 132 in storage unit 1220 (S1202). ISP 1200 then sends the location deregistration completion message to mobile node 160 (S1204).

As explained above, in the network system of the present invention, when mobile node 160 moves from home network 1100 to foreign network 400, ISP 1200 stores in its location management table a care-of address for the mobile node 160 that has moved. Upon receipt of data destined for the mobile node 160, ISP 1200 determines in which foreign network 400 the mobile node 160 as the destination is currently located, based on the location management table stored in itself. ISP 1200 then forwards the data to the relevant foreign network 400. Accordingly, it is possible to determine as to where data should be forwarded, according to the location management table stored, not in the home gateway 1110 of a lower layer in hierarchy, but in the ISP 1200 of its upper layer. This eliminates a need to communicate with the home gateway of the lower layer to fetch the data forwarding address therefrom. Therefore, data transmission is enabled with a shorter communication route.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A system comprising a sever and a plurality of networks that are separately connected to said server;
    wherein each said network includes
        at least one mobile terminal primarily assigned to said network as its home network that receives preselected data from said server and outputs the received preselected data, said at least one mobile terminal being movable from its primarily assigned network to another of said plurality of networks,
        a communication device that sends said preselected data received from said server to all mobile terminals primarily assigned to any of said plurality of networks located within a range of communication of said communication device wirelessly, and
        a detection device that detects any said mobile terminals primarily assigned to any of said plurality of networks present within said range of communication of said communication device by detecfing said output of said received preselected data therefrom; and
    wherein said server includes
        a communication circuit that communicates with the communication device and the detection device included in each said network,
        a storage circuit connected to said communication circuit, said storage circuit storing in the form of a management table for each mobile terminal (i) information specifying the network in which that mobile terminal is currently located based on information received from said detection device and (ii) prestored information specifying the home network of that mobile terminal, and
        a control circuit connected to said communication circuit and to said storage circuit, said control circuit being adapted to receive data and information including a vortion indicating a specified mobile terminal primarily assigned to one of said plurality of networks as the destination of a remainder of said received data and information, and to control said communication circuit such that it sends said remainder of said received data and information to the specified mobile terminal based on information concerning the specified mobile terminal contained in said management table.

2. The network system according to claim 1,
    wherein the communication device includes
        a first transmission circuit that transmits inquiry information concerning whether any mobile terminal is located within the communication range of the communication device,
    wherein the detection device includes
        a receiving circuit that receives in-zone information output by all mobile terminals present within the communication range of the communication device in response to said inquiry information, and
        a second transmission circuit connected to said receiving circuit that transmits to said server first identification information specifying the ones of the mobile terminals that transmitted said in-zone information and second identification information specifying the network in which said detection device is included,
    wherein said storage circuit includes a circuit storing
        a management table including, for each mobile terminal identified by the first identification information, said second identification information and said prestored information specifying the home network of each mobile terminal present within the communication range of the communication device;
    wherein said data and information indicating a specified one of the mobile terminals as the destination of the remainder of the data and information is represented in the first identification information, and
    wherein said control circuit includes
        a circuit that reads from said management table the second identification information corresponding to the first identification information;
        a circuit that compares the read second identification information and the prestored information specifying the home network, and
        a circuit that controls said communication circuit so as to send the remainder of said data and information to the communication device located in the network identified by the second identification information when the read second identification information and the information identifying the home network differ from one another.

3. The network system according to claim 1, wherein
said server further includes a connection circuit that connects to another network not included in said plurality of networks, and
said server receives said data and information indicating the specified mobile terminal as the destination of the remainder of the received data and information from a device connected to said another network.

4. The network system according to claim 3, wherein
said another network is the Internet, and
said connection circuit includes a circuit that connects to the Internet via a public network.

5. A system comprising a server and a plurality of networks that are separately connected to said server,
wherein each said netwdrk includes
at least one mobile terminal primarily assigned to said network as its home network that receives preselected data from said server and outputs the received preselected data, said at least one mobile terminal being movable from its primarily assigned network to another of said plurality of networks,
a communication device that sends said preselected data received from said server to all of said at least one mobile terminals located within a range of communication of said communication device wirelessly, and
a detection device that detects any of said at least one mobile terminal primarily assiged to any of said plurality of networks present within said range of communication of said communication device by detecting said output of said received preselected data therefrom; and
wherein said server includes
communication means for communicating with the communication device and the detection device included in each said network,
storage means, connected to said communication means for storing in the form of a management table for each mobile terminal (i) information specifying the network in which that mobile terminal is currently located based on information received from said detection device and (ii) prestored information specifying the home network of that mobile terminal, and
control means connected to said communication means and to said storage means, for receiving data and information including a portion indicating a specified mobile terminal primarily assigned to one of said networks as the destination of a remainder of said received data and information, and for controlling said communication means such that it sends said remainder of said received data and information to the specified mobile terminal based on the information concerning the specified mobile terminal contained in said management table.

6. The network system according to claim 5,
wherein said communication device includes
first transmission means for transmitting inquiry information concerning whether any mobile terminal is located within the communication range of the communication device,
wherein the detection means includes
receiving means for receiving in-zone information output by all mobile terminals present within the communication range of the communication device in response to said inquiry information, and
second transmission means, connected to said receiving means, for transmitting to said server, first identification information specifying the ones of the mobile terminals that transmitted said in-zone information and second identification information specifying the network in which said detection device is included,
wherein said storage means includes means for storing a management table including, for each mobile terminal identified by the first identification information, said second identification information and said prestored information specifying the home network of each mobile terminal present within the communication range of the communication device;
wherein said data and information indicating a specified one of the mobile terminals as the destination of the remainder of the data and information is represented in the first identification information, and
wherein said control means includes
means for reading from said management table the second identification information corresponding to the first identification information,
means for comparing the read second identification information and the prestored information specifying said home network, and
means for controlling said communication means so as to send the remainder of said data and information to the communication device located in the network identified by the read second identification information when the read second identification information and the information specifying the home network differ from one another.

7. The network system according to claim 5, wherein
said server further includes connection means for connecting to another network not included in said plurality of networks, and
said server receives said data and the information indicating the specified mobile terminal as the destination of the received data and information from a device connected to said another network.

8. The network according to claim 7, where said another network is the Internet, and
said connection means includes means for connecting to said Internet via a public network.

9. A server for use in a system including the server and a plurality of networks that are separately connected to said server,
wherein each said network includes
at least one mobile terminal primarily assigned to said network as its home network that receives preselected data from said server and outputs the received preselected data, said at least one mobile terminal being movable from its primarily assigned network to another of said plurality of networks,
a communication device that sends said preselected data received from said server to any of said at least one mobile terminal primarily assigned to any of said plurality of networks located within a range of communication of said communication device wirelessly, and
a detection device that detects any of said at least one mobile terminal primarily assianed to any of said plurality of networks present within said range of communication of said communication device by detecting said output of said received preselected data therefrom;

said server comprising:
- a communications circuit that communicates with the communication device and the detection device included in each said network;
- a storage circuit connected to said communication circuit, said storage circuit storing in the form of a management table for each mobile terminal (i) information specifying the network in which that mobile terminal is currently located based on information received from said detection device and (ii) prestored information specifying the home network of that mobile terminal; and
- a control circuit connected to said communication circuit and to said storage circuit, said control circuit being adapted to receive data and information including a portion indicating a specified mobile terminal primarily assigned to one of said plurality of networks as the destination of a remainder of said received data and information, and to control said communication circuit such that it sends said remainder of said received data and information to the specified mobile terminal based on information concerning the specified mobile terminal contained in said management table.

10. The server according to claim 9,
wherein said communication device includes
- a first transmission circuit that transmits inquiry information concerning whether any mobile terminal is located within the communication range of said communication device, wherein said detection device includes
- a receiving circuit that receives in-zone information output by all mobile terminals present within the communication range of the communication device in response to said inquiry information, and
- a second transmission circuit connected to said receiving circuit that transmits to said server, first identification information specifying the ones of the mobile terminals that transmitted in-zone information and second identification information specifying the network in which said detection device is included, wherein said storage circuit includes a circuit storing a management table including, for each mobile terminal identified by the first identification information, said second identification information and said prestored information specifying the home network of each mobile terminal present within the communication range of the communication device, wherein said data and information indicating a specified one of the mobile terminals as the destination of the remainder of the data and information is represented in the first identification information, and wherein said control circuit includes
- a circuit that reads from said management table the second identification information corresponding to the first identification information,
- a circuit that compares the read second identification information and the prestored information specifying the home network, and
- a circuit that controls said communication circuit so as to send the remainder of said data and information to the communication device in the network identified by the read second identification information when the read second identification information and the information specifying the home network differ from one another.

11. The server according to claim 9, further comprising a connection circuit that connects to another network not included in said plurality of networks,
wherein said server receives said data and the information indicating the specified mobile terminal as the destination of the remainder of the data and information from a device connected to said another network.

12. The server according to claim 11, wherein said another network is the Internet, and
said connection circuit includes a circuit that connects to the Internet via a public network.

13. A server for use in a system including a server and a plurality of networks that are separately connected to said server,
wherein each said network includes
- at least one mobile terminal primarily assigned to said network as its home network that receives preselected data from said server and outputs the received preselected data, said at least one mobile terminal being movable from its primarily assigned network to another of said plurality of networks,
- a communication device that sends said preselected data received from said server to any of said at least one mobile terminals primarily assigned to any of said plurality of networks located within a range of communication of said communication device wirelessly, and
- a detection device that detects any of said at least one mobile terminal primarily assigned to any of said plurality of networks present within said range of communication of said communication device by detecting said output of said received preselected data therefrom; and said server comprising:
- communication means for communicating with the communication device and the detection device included in each said network;
- storage means, connected to said communication means for storing in the form of a management table for each mobile terminal (i) information specifying the network in which that mobile terminal is currently located based on information received from said detection device and (ii) prestored information specifying the home network of that mobile terminal; and
- control means, connected to said communication means and to said storage means, for receiving data and information indicating a specified mobile terminal as the destination of a remainder of the data and information, and for controlling said communication means such that it sends said remainder of said data and information to the specified mobile terminal based on the information concerning the specified mobile terminal contained in said management table.

14. The server according to claim 13,
wherein said communication device includes
- first transmission means for transmitting inquiry information concerning whether any mobile terminal is located within the communication range of the communication device, wherein the detection device includes
- receiving means for receiving rn-zone information output by all mobile terminals present within the communication range of the communication device in response to said inquiry information, and
- second transmission means, connected to said receiving means, for transmitting to said server first identification information specifying the ones of the mobile terminals that transmitted in-zone information and second identification information specifying the network in which said detection device is included, wherein said storage means includes means for storing a management table including, for each mobile terminal identified by the first identification information, said second identification information and said prestored information specifying the home network of each mobile terminal present within the communication range of the communication device, wherein said data and information indicating a specified one of said mobile terminals as the destination of the data and information is represented in the first identification information, and wherein said control means includes
  means for reading from said management table the second identification information corresponding to the first identification information,
  means for comparing the read second identification information and the prestored information specifying the home network, and
  means for controlling said communication means so as to send said received data and information to the communication device in the network identified by the read second identification information when the read second identification information and the information specifying the home network differ from one another.

15. The server according to claim 13, further comprising connection means for connecting to another network not included in said plurality of networks, and
  said server receives said data and the information indicating the specified mobile terminal as the destination of the remainder of the data and information from a device connected to said another network.

16. The server according to claim 15, wherein said another network is the Internet, and
  said connection means includes means for connecting to the Internet via a public network.

17. A communication method of a server in a system including the server and a plurality of networks that are separately connected to said server,
  wherein each said network includes
    at least one mobile terminal primarily assigned to said network as its home network that receives preselected data from said server and outputs the received preselected data, said at least one mobile terminal being movable from its primarily assigned network to another of said plurality of networks,
    a communication device that sends said preselected data received from said server to any of said at least one mobile terminals primarily assigned to any of said plurality of networks located within a range of communications of said communication device wirelessly, and
    a detection device that detects any of said at least one mobile terminals primarily assigned to any of said plurality of networks present within said range of communication of said communication device by detecting said output of said received preselected data therefrom; and
  said communication method comprising the steps of:
    storing in the form of a management table including, for each said mobile terminal, (i) information specifying the network in which that mobile terminal is currently located based on information received from said detection device and (ii) prestored information specifying the home network of that mobile terminal;
    receiving data and information indicating a specified one of said mobile terminals as the destination of the data and information, and,
    sending said received data and information to the specified one of said mobile terminals as the destination thereof.

18. The communication method according to claim 17,
wherein said communication device includes
  a first transmission circuit that transmits inquiry information concerning whether any mobile terminal is located within the communication range of the communication device,
wherein the detection device includes
  a receiving circuit that receives in-zone information output by all mobile terminals present within the communication range of the communication device in response to said inquiry information, and
  a second transmission circuit connected to said receiving circuit that transmits to said server, first identification information specifying the ones of the mobile terminals that transmitted said in-zone information and second identification information specifying the network in which said detection device is included,
wherein said step of storing the management table includes the step of storing a management table including, for each mobile terminal identified by the first identification information, said second identification information and said prestored information specifying the home network of each mobile terminal present within the communication range of the communication device,
wherein said data and information indicating a specified one of the mobile terminals as the destination of the remainder of the data and information is represented in the first identification information, and
wherein said step of sending the remainder of said data and information to said specified mobile terminal as the destination thereof includes the steps of
  reading from said management table the second information corresponding to the first identification information,
  comparing the read second identification information and the prestored information specifying the home network, and
  sending the remainder of said data and information to the communication device in the network identified by the read second identification information when the read second identification information and the information specifying the home network differ from one another.

19. The communication method according to claim 17,
wherein said server is connected to another network not included in said plurality of networks and
said server receives said data and the information indicating the specified mobile terminal as the destination of the remainder of the data and information from a device connected to said another network.

20. The communication method according to claim 19,
wherein said another network is the Internet, and
  said server is connected to the Internet via a public network.

21. A computer readable recording medium for use in recording a program for implementing a communication method of a server in a system including a server and a plurality of networks separately connected to said server, wherein each said network includes
- at least one mobile terminal primarily assigned to said network as its home network that receives preselected data from said server and outputs the received preselected data, said at least one mobile terminal being movable from its primarily assigned network to another of said plurality of networks,
- a communication device that sends said preselected data received from said server to any of said at least one mobile terminal primarily assigned to any of said plurality of networks located within a range of communication of said communication device wirelessly, and
- a detection device that detects any of said at least one mobile terminal primarily assigned to any of said plurality of networks present within said range of communication of said communication device by detecting said output of said received preselected data therefrom; and wherein said communication method comprises the steps of:
- storing a management table including, for each said mobile terminal, (i) information specifying the network in which that mobile terminal is currently located based on information received from said detection device and (ii) prestored information specifying the home network of each said mobile terminal;
- receiving data and information indicating a specified one of said mobile terminals as the destination of the data and information, and,
- sending said received data and information to the specified one of said mobile terminals based on the information concerning the specified one of the mobile terminals contained in said management table.

22. The recording medium according to claim 21, wherein said communication device includes
- a first transmission circuit that transmits inquiry information concerning whether any mobile terminal is located within the communication range of said communication device, wherein the detection device includes
- a receiving circuit that receives in-zone information output by all mobile terminals present within the communication range of the communication device in response to said inquiry information, and
- a second transmission circuit connected to said receiving circuit that transmits to said server first identification information specifying the ones of the mobile terminals that transmitted said in-zone information and second identification information specifying the network in which said detection device is included, wherein said step of storing a management table includes the step of storing a management table including, for each mobile terminal identified by the first identification information, said second identification information and said prestored information specifying said home network of each mobile terminal present within the communication range of the communication device, wherein said data and information indicating a specified one of the mobile terminals as the destination of the remainder of the data and information is represented in the first identification information, and wherein said step of sending the remainder of the data and information to said specified one of the mobile terminals as the destination thereof includes the steps of
- reading from said management table the second information corresponding to the first identification information,
- comparing the read second identification information and the prestored information specifying the home network, and
- sending said remainder of said data and information to the communication device in the network identified by the read second identification information when the read second information and the information specifying the home network differ from one another.

23. The recording medium according to claim 21, wherein said server is connected to another network not included in said plurality of networks, and said server receives said data and the information indicating the specified mobile terminal as the destination of the remainder of the data and information from a device connected to said another network.

24. The recording medium according to claim 23, wherein said another network is the Internet, and said connection means includes means for connecting to the Internet via a public network.

* * * * *